UNITED STATES PATENT OFFICE.

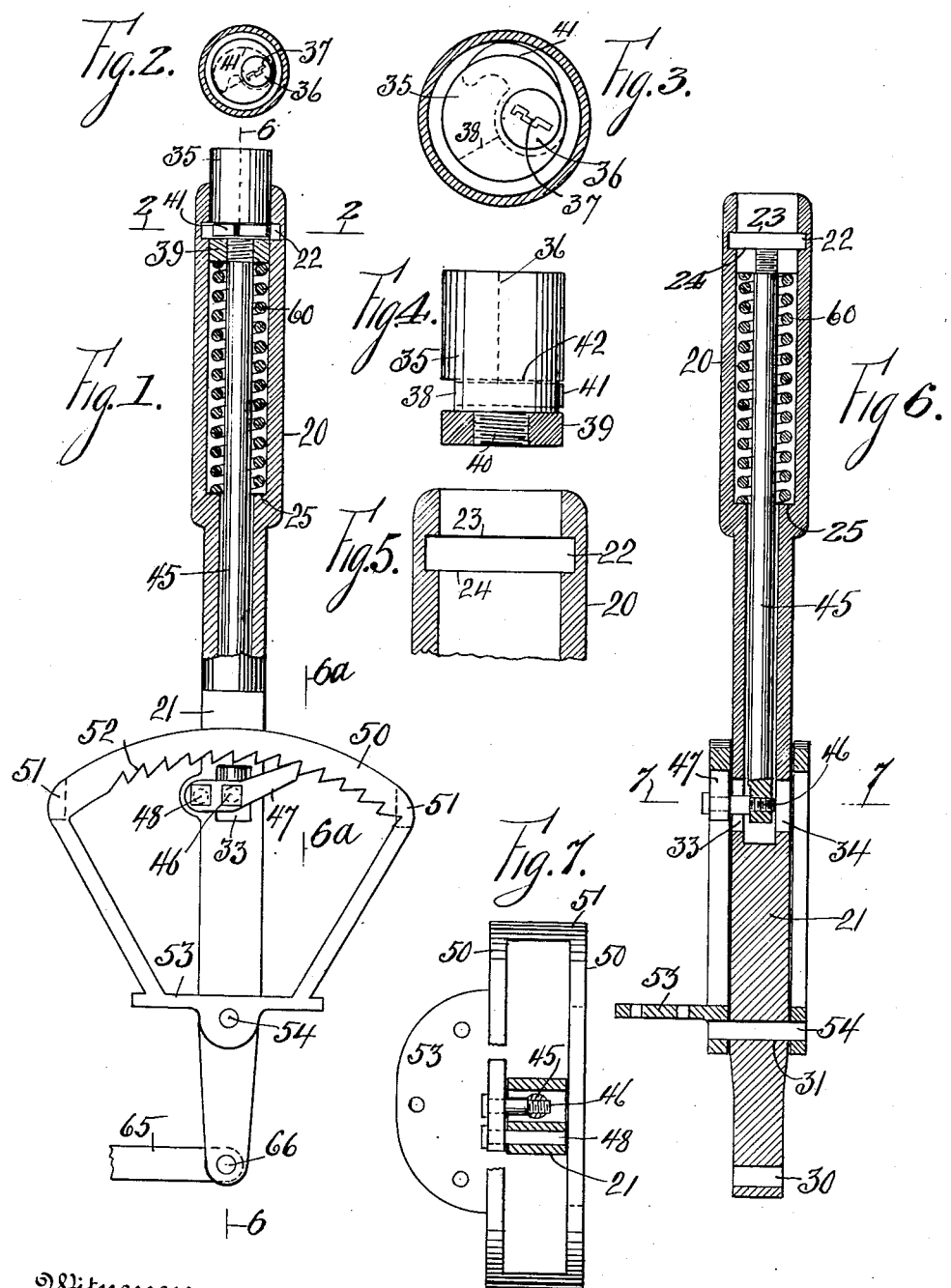

ALBERT H. GEERY, OF JERSEY CITY, NEW JERSEY, ASSIGNOR OF ONE-HALF TO WARREN R. CONKLIN, OF BAYONNE, NEW JERSEY.

DEVICE FOR LOCKING LEVERS.

1,198,341. Specification of Letters Patent. Patented Sept. 12, 1916.

Application filed February 20, 1913. Serial No. 749,587.

*To all whom it may concern:*

Be it known that I, ALBERT H. GEERY, a citizen of the United States, and a resident of Jersey City, in the county of Hudson and State of New Jersey, have invented certain new and useful Improvements in Devices for Locking Levers, of which the following is a specification.

This invention relates to means for locking levers in place. It is exemplified in this application with the brake lever of a motor vehicle. The invention may be applied to the controlling or other levers of various vehicles, and in fact with any mechanism for the purpose of locking a lever thereof in place.

Figure 1 represents an elevation of the invention with a part thereof in vertical axial section; Fig. 2 shows a partial top view and section of Fig. 1 on the line 2, 2; Fig. 3 is a view similar to Fig. 2 with the movable elements thereof in a changed position; Fig. 4 represents an enlarged outside elevation of the lock of the invention with a partial axial section thereof; Fig. 5 is an enlarged fragmentary portion of the upper part of Fig. 1; Fig. 6 shows a partial section of Fig. 1 on the lines 6, 6 and 6ª, 6ª and Fig. 7 is a top plan view and partial section of Fig. 6 on the line 7, 7.

A brake lever is shown with the upper enlarged hollow cylindrical portion 20 and the lower preferably rectangular portion 21. The portion 20 has formed adjacent to its upper end and on the inner cylindrical portion thereof the annular depression 22 with the upper shoulder 23 and the lower shoulder 24. At the lower end of said enlarged portion 20 is formed the shoulder 25. Openings 30 and 31 are formed in the rectangular portion 21 for purposes to be described and openings 33 and 34 are formed in the side walls of the rectangular portion 21.

At the upper end of the cylindrical portion 20 is slidably supported the cylindrical lock 35, with the key plug 36 having the key opening 37 and preferably of the tubular type, having pin or other suitable tumblers. The casing of the lock has extending therefrom a connecting wall 38, from which latter extends the collar 39 with the internally threaded opening 40. A latch arm 41 extends from the plug 36, and can swing with said plug in the clearance space between the low surface 42 of the casing of the said lock and the upper surface of the collar 39.

A locking rod 45 is located throughout its whole length within the brake lever and its upper end is in threaded engagement with the collar 39. A pin 46 supported in the lower end of the locking rod 45 extends through the opening 33 and has pinned thereon the pawl 47. The object of the opening 34 is to upset the end of the pin 46 if desired. The pawl 47 is also pinned to the brake lever by means of the pin 48.

A ratchet sector is shown with the members 50, connected at their upper ends by the cross members 51. One of the members 50 has formed therewith the ratchet teeth 52 and the foot piece 53. A pin 54 joins the members of the ratchet sector with the rectangular portion 21 of the brake lever by engaging the opening 31 thereof. A spring 60 surrounds the locking rod 45 and bears between the lower surface of the collar 39 and the shoulder 25 of the said brake lever.

The foot piece 53 is shown bolted to the body 64 of a motor vehicle and a connecting link 65 has an end pinned to brake lever through the opening 30 by means of a pin 66 and the other end is connected to a brake or other suitable element to be controlled.

The locking device of the invention under normal conditions is unlocked, with the latch arm 41 disengaged from the annular depression 22 of the hollow portion 20. With this location of parts a slight pressure upon the top surface of the lock 35 forces down the locking rod 45 and disengages the pawl 47 from the ratchet teeth 52. When the said pawl is free the operator can swing the brake lever to any desired position and in this instance set the brake 70.

Upon releasing the pressure from the lock 35 the pawl 47 will engage with the ratchet teeth 52 in the desired location. Should it be desired to lock the pawl in place the operator turns the plug 36 by entering a key in the opening 37, turning the plug 36 and thereby engaging the latch arm 41 with the annular depression 22. In this locked position the brake lever can not move.

Having described my invention what I desire to secure by Letters Patent and claim is:

In a locking and adjusting lever the combination of a hollow portion having an inner annular depression, a locking rod in said hollow portion, a lock connected to said rod, a latch arm connected to said lock located to engage said depression, resilient means in said hollow portion coacting with said rod to maintain it in its normally elevated position, a ratchet sector for the lever, a pawl with one end pinned to the lever and a pin intermediate to its point of attachment to said lever and its operating end connecting said pawl with said rod, the pawl coacting with said ratchet sector.

Signed at the borough of Manhattan, in the county of New York and State of New York, this 15th day of Feb., A. D. 1913.

ALBERT H. GEERY.

Witnesses:
A. A. DE BONNEVILLE,
W. R. CONKLIN.